United States Patent
Lee

(10) Patent No.: US 8,388,320 B2
(45) Date of Patent: Mar. 5, 2013

(54) MOUNT FOR COMPRESSOR SHELL

(75) Inventor: Sang-Min Lee, Masan-shi (KR)

(73) Assignee: LG Electronics Inc., Seoul (KR)

( * ) Notice: Subject to any disclaimer, the term of this patent is extended or adjusted under 35 U.S.C. 154(b) by 358 days.

(21) Appl. No.: 12/449,250

(22) PCT Filed: Mar. 21, 2008

(86) PCT No.: PCT/KR2008/001622
§ 371 (c)(1),
(2), (4) Date: Jul. 30, 2009

(87) PCT Pub. No.: WO2008/117961
PCT Pub. Date: Oct. 2, 2008

(65) Prior Publication Data
US 2010/0068078 A1   Mar. 18, 2010

(30) Foreign Application Priority Data

Mar. 23, 2007   (KR) .................. 10-2007-0028803

(51) Int. Cl.
*F04B 17/00*   (2006.01)
*F04B 35/00*   (2006.01)

(52) U.S. Cl. ....................................... 417/363

(58) Field of Classification Search .......... 417/363, 417/902, 423.14, 423.15, 360; 248/638, 248/637, 645; 181/202, 204, 207
See application file for complete search history.

(56) References Cited

U.S. PATENT DOCUMENTS

| 3,187,995 A |   | 6/1965 | Kjeldsen |  |
|---|---|---|---|---|
| 3,669,573 A | * | 6/1972 | Levensohn | 417/416 |
| 3,955,900 A | * | 5/1976 | Vinci | 417/361 |
| 4,573,880 A | * | 3/1986 | Hirano et al. | 417/312 |
| 5,306,121 A | * | 4/1994 | Heflin et al. | 417/363 |
| 6,352,247 B1 |   | 3/2002 | Ishikawa et al. |  |
| 6,648,616 B2 | * | 11/2003 | Patel et al. | 417/572 |
| 6,761,541 B1 | * | 7/2004 | Clendenin | 417/360 |
| 6,929,455 B2 | * | 8/2005 | Dreiman et al. | 417/410.3 |
| 2005/0053485 A1 |   | 3/2005 | Inoue et al. |  |
| 2005/0158185 A1 |   | 7/2005 | Herrick et al. |  |

FOREIGN PATENT DOCUMENTS

| GB | 2 102 080 A | 1/1983 |
|---|---|---|
| JP | 3 100 386 A | 4/1991 |

(Continued)

OTHER PUBLICATIONS

JP 03100386 A abstract;Apr. 1991;Mochizuki et al.*

*Primary Examiner* — Devon Kramer
*Assistant Examiner* — Amene Bayou
(74) *Attorney, Agent, or Firm* — McKenna Long & Aldridge LLP

(57) ABSTRACT

The present invention discloses a compressor including a compressor main body (20) for compressing refrigerant, a shell (100) for accommodating the refrigerant and the compressor main body (20), and mounts (130) attached to the front and rear of the shell (100) for the installation of the shell (100), and having a natural frequency controlled according to a natural frequency of the shell (100) for the dynamic vibration absorption. In an assembly state where the compressor main body (20) and the shell (100) are completely coupled to each other, the shell (100) is exited by an impact hammer and the natural frequency of the shell (100) is measured. As the natural frequency of the mount (130) is controlled according to the natural frequency of the shell (100) to absorb vibration, Vibration of the shell (100) can be prevented. That is, the mount functions as a dynamic vibration absorber to suppress vibration and noise of the shell (100).

5 Claims, 5 Drawing Sheets

FOREIGN PATENT DOCUMENTS

| | | | |
|---|---|---|---|
| JP | 03100386 A * | 4/1991 | |
| JP | 4 262 076 A | 9/1992 | |
| JP | 04-262076 A | 9/1992 | |
| JP | 8 086 282 A | 4/1996 | |
| JP | 2000-199483 A | 7/2000 | |

* cited by examiner

Fig. 3
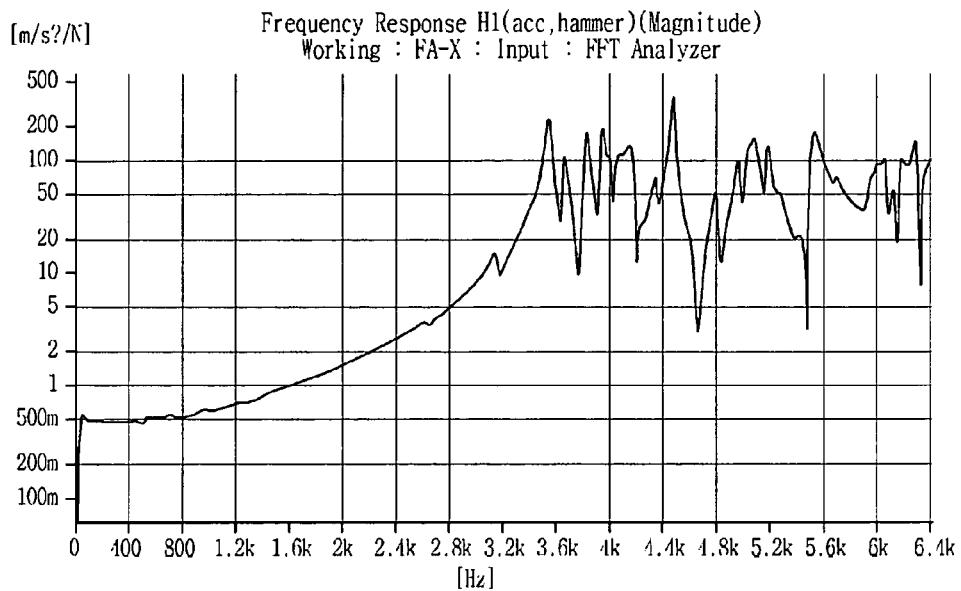
Fig. 4
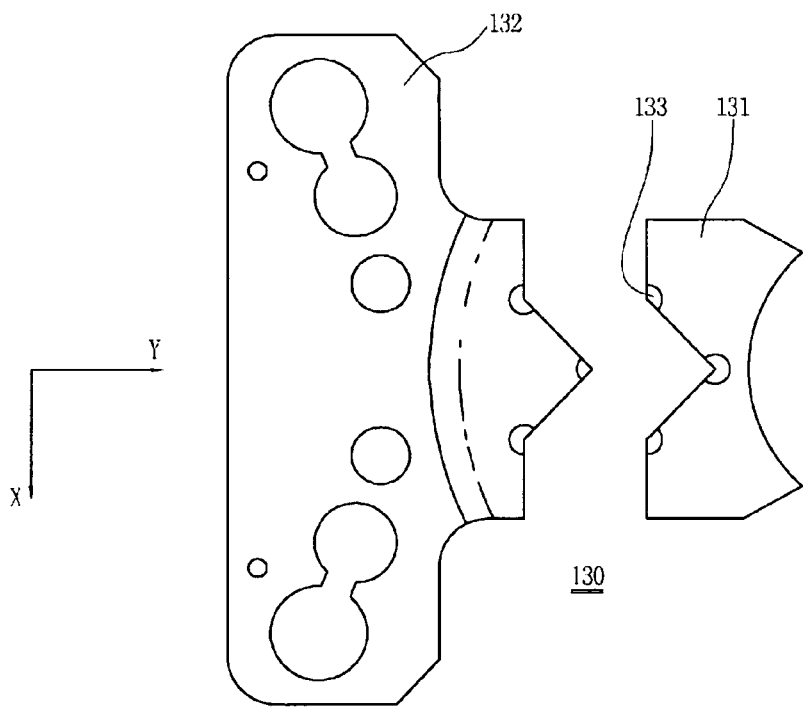
Fig. 5
| One points | Two points | Three points | Four points | Four points |
|---|---|---|---|---|

# MOUNT FOR COMPRESSOR SHELL

This application is a national stage entry of International Application No. PCT/KR2008/001622, filed Mar. 21, 2008, and claims the benefit of Korean Application No. 10-2007-0028803, filed on Mar. 23, 2007, both of which are hereby incorporated by reference for all purposes as if fully set forth herein.

TECHNICAL FIELD

The present invention relates to a compressor, and more particularly, to a compressor with a mount functioning as a dynamic vibration absorber.

BACKGROUND ART

In general, a compressor is a mechanical apparatus that receives power from a power generation apparatus such as an electric motor, a turbine or the like and compresses air, refrigerant or various operation gases to raise a pressure. The compressor has been widely used in an electric home appliance such as a refrigerator and an air conditioner, or in the whole industry.

The compressor is roughly classified into a reciprocating compressor wherein a compression space to/from which an operation gas is sucked and discharged is defined between a piston and a cylinder, and the piston is linearly reciprocated inside the cylinder to compress refrigerant, a rotary compressor wherein a compression space to/from which an operation gas is sucked and discharged is defined between an eccentrically-rotated roller and a cylinder, and the roller is eccentrically rotated along an inner wall of the cylinder to compress refrigerant, and a scroll compressor wherein a compression space to/from which an operation gas is sucked and discharged is defined between an orbiting scroll and a fixed scroll, and the orbiting scroll is rotated along the fixed scroll to compress refrigerant.

Recently, a linear compressor has been developed among the reciprocating compressors. In the linear compressor, a piston is coupled directly to a linearly-reciprocated driving motor to prevent a mechanical loss by motion conversion, improve the compression efficiency and simplify the configuration.

FIG. 1 illustrates one example of a compressor. Normally, refrigerant is filled in a hermetic shell 10 of the compressor. In addition, a compressor main body 20 is accommodated in the shell 10. The refrigerant filled in the shell 10 is introduced into the compressor main body 20, compressed and discharged.

The compressor is generally used in a thermodynamic cycle and mostly installed in an apparatus such as a refrigerator, an air conditioner, etc. A mount 30 attached to a lower portion of the shell 10 is coupled to the apparatus in which the compressor is to be installed, so that the compressor can be fixed to the apparatus.

Some of the constituent elements of the compressor main body 20 perform the motion to compress refrigerant, thereby generating noise and vibration of the compressor. Such noise and vibration are imparted to the apparatus where the compressor is mounted. As a result, vibration and noise of the apparatus are increased.

DISCLOSURE OF INVENTION

Technical Problem

Therefore, an object of the present invention is to provide a compressor capable of reducing noise and vibration.

Another object of the present invention is to provide a compressor including a mount using a dynamic vibration absorber concept.

A further object of the present invention is to provide a compressor including a mount composed of two parts divided by a fixing point fixed to a shell, at least one of the parts being capable of reducing noise of the shell.

Technical Solution

According to an aspect of the present invention for achieving the above objects, there is provided a compressor, including: a compressor main body for compressing refrigerant; a shell for accommodating the compressor main body; and mounts attached to the front and rear of the shell for the installation of the shell, each of which including two parts having a natural frequency included in any one of a first natural frequency±15 Hz range and a second natural frequency±15 Hz range of the shell. Here, in an assembly state where the compressor main body and the shell are completely coupled to each other, the shell is excited by an impact hammer and the natural frequency of the shell is measured. As the natural frequency of the mount is controlled according to the natural frequency of the shell to absorb vibration and reduce noise, vibration of the shell can be prevented. That is, a dynamic vibration absorber concept is applied to the mount to thereby reduce vibration and noise of the shell. The above configuration serves to reduce noise by the resonance caused by the first natural frequency and the second natural frequency of the shell which are bands mostly generating noise.

According to another aspect of the present invention, the mount is provided with a fixing point fixed to the shell, and divided into two parts by a line passing through the fixing point.

According to a further aspect of the present invention, the mount is provided with two or more fixing points positioned on a straight line to be fixed to the shell, and divided into two parts by the straight line passing through the fixing points.

According to a still further aspect of the present invention, the mount is provided with two fixing points positioned on a straight line and one fixing point positioned outside the straight line to be fixed to the shell, and divided into two parts by the line segments defined by the fixing points.

According to a still further aspect of the present invention, the mount is provided with four or more fixing points positioned on two or more straight lines to be fixed to the shell, and divided into three or more parts by the straight lines, at least one outer part being included in any one of the first natural frequency±15 Hz range and the second natural frequency±15 Hz range of the shell.

According to a still further aspect of the present invention, the mount is fixed to the shell by means of welding.

BRIEF DESCRIPTION OF THE DRAWINGS

FIG. 3 is a graph showing noise by a natural frequency measuring experiment of a shell of the compressor;

FIG. 4 is a view illustrating the mount divided into two parts having different natural frequencies according to one embodiment of the present invention;

FIG. 5 is a view illustrating examples of fixing points and division lines defined to divide the mount;

MODE FOR THE INVENTION

Hereinafter, preferred embodiments of the present invention will be described in detail with reference to the accompanying drawings.

Figure 1:
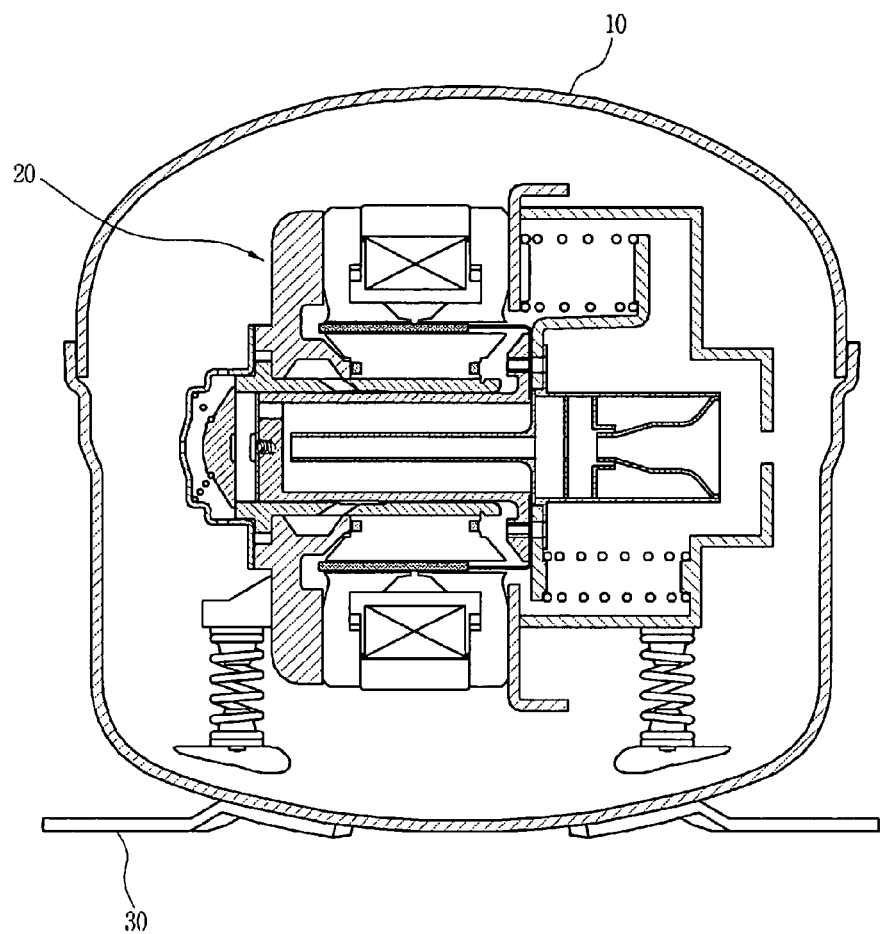
FIG. 1 is a view illustrating one example of a compressor.
Figure 2:
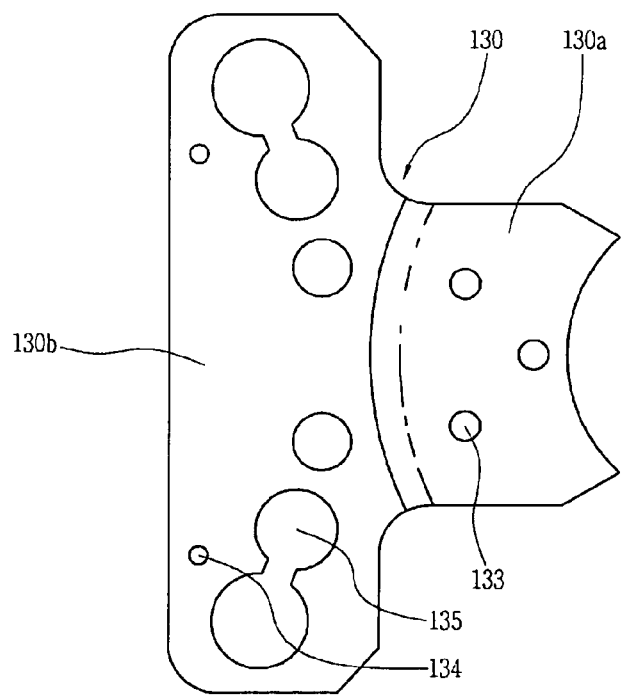
FIG. 2 is a view illustrating a mount provided to a compressor according to one embodiment of the present invention.

FIG. 2 is a view illustrating a mount of a compressor according to one embodiment of the present invention. The mount 130 is composed of a part 130a attached to a shell (not shown), and a part 130b attached to an apparatus in which the compressor is to be installed. The mount 130 has the curvature so that the part 130a attached to the shell and the part 130b attached to the apparatus can have a height difference. The part 130b attached to the apparatus may have fastening holes 134 to be bolt-fastened to the apparatus. The part 130a attached to the shell is welded to the shell in fixing points 133. In a case where the shell and the mount 130 are fastened by means of bolts, refrigerant filled in the shell or oil lubricating a compressor main body may be leaked out. Therefore, it is preferable that the shell and the mount 130 are attached to each other by means of welding. Normally, the mounts 130 are attached to both sides of the shell to install the shell in the apparatus. The mount 130 is set to have a natural frequency corresponding to a natural frequency of the shell.

FIG. 3 is a graph obtained by an experiment of measuring a natural frequency of the shell. In a state where the perfectly-assembled compressor main body was installed inside the shell, the shell was excited by an impact hammer from the outside, and the natural frequency of the shell was measured. In addition, the experiment result was analyzed by an FFT analyzer. In the graph, noise peak portions indicate natural frequencies of the shell. A first peak and a second peak are first and second natural frequencies of the shell.

FIG. 4 is a view illustrating the mount of the compressor composed of a first part and a second part according to one embodiment of the present invention. The mount 130 includes a first part 131 having a natural frequency which is identical to the first natural frequency of the shell or exists within 15 Hz from the first natural frequency of the shell, and a second part 132 having a natural frequency which is identical to the second natural frequency of the shell or exists within 15 Hz from the second natural frequency of the shell. The first part 131 and the second part 132 are divided by an imaginary line passing through the fixing points 133 of the mount 130. When it is assumed that a height direction of the shell is a Z axis direction, a width direction of the shell is an X axis and a length direction of the shell is an Y axis. That is, the mounts 130 attached to both sides of the shell are positioned on a straight line parallel to the Y axis. Here, the division line passing through the fixing points 133 is preferably parallel to the X axis. If the mount 130 is divided by a line parallel to the Y axis, two parts are vibrated with different frequencies, and cannot easily absorb vibration of the shell and reduce noise.

FIG. 5 is a view illustrating a few examples of fixing points and division lines defined to divide the mount. The mount is mostly attached to the shell by means of spot welding. When the mount and the shell are welded in one point, the mount is divided into a first part and a second part by a division line passing through a fixing point and being parallel to the X axis. When the mount and the shell are welded in two points, the mount is divided into a first part and a second part by a division line passing through two fixing points and being parallel to the X axis. In addition, when the mount and the shell are welded in three points, it is more stable to arrange fixing points in a triangular shape. A division line is parallel to the X axis and is formed in a triangular shape in some section so as to pass through the three fixing points. When the mount and the shell are welded in four points, preferably, two fixing points are formed inside the shell and two fixing points are formed outside the shell. More preferably, a division line passes through the outer fixing points and is parallel to the X axis. Here, a line connecting the inner fixing points needs not to be parallel to the X axis. A first part having a natural frequency controlled according to the first natural frequency of the shell may be formed on the side of the shell or the apparatus with respect to the division line. Accordingly, in a case where the first part is formed on the side of the shell, a second part having a natural frequency controlled according to the second natural frequency of the shell is formed on the side of the apparatus, and in a case where the first part is formed on the side of the apparatus, the second part is formed on the side of the shell.

Figure 6:
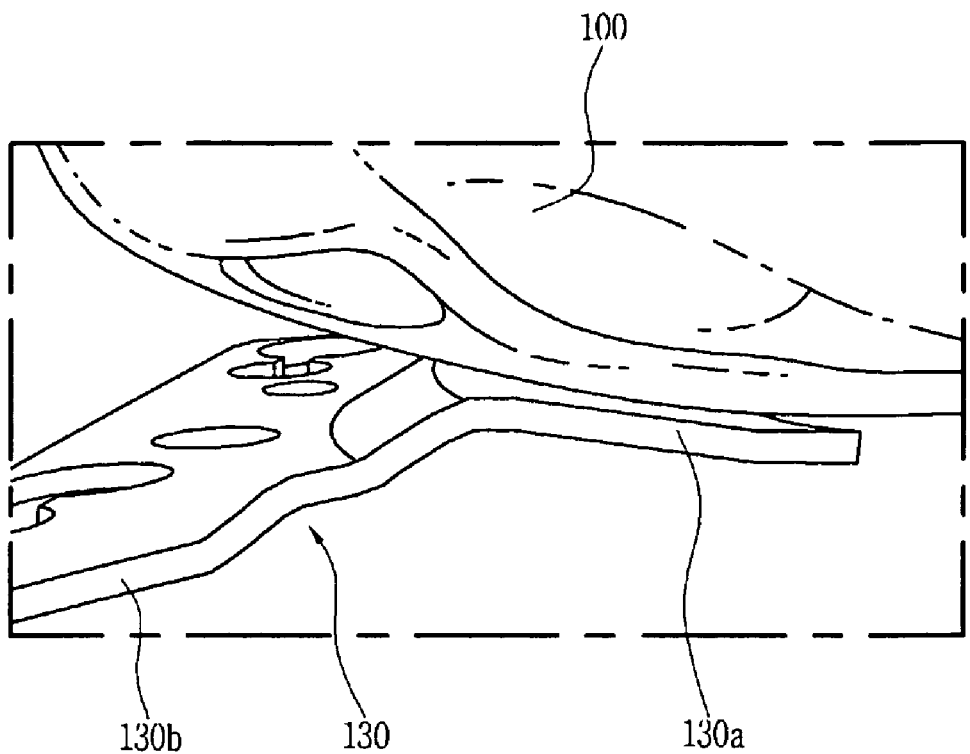
FIGS. 6 and 7 are views illustrating the mount attached to the shell of the compressor according to one embodiment of the present invention.
Figure 7:
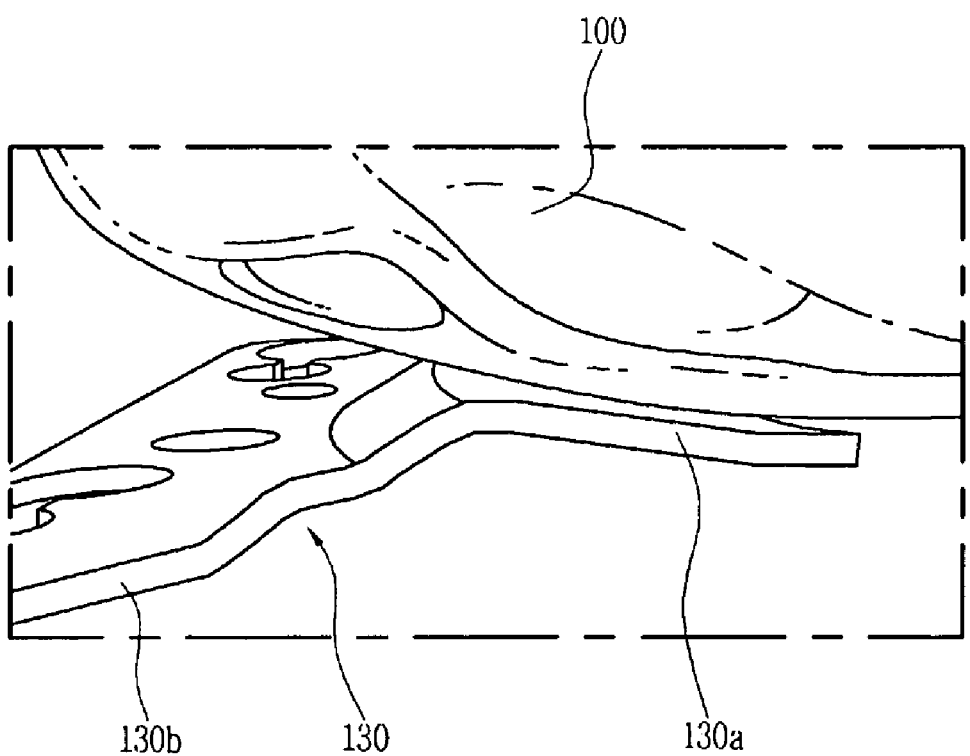

FIGS. 6 and 7 are views illustrating the compressor with the mount attached to the shell. As described above, the mount 130 is attached to the shell 100 by means of spot welding. Generally, the welding is performed in two to four fixing points in consideration of the size of the mount 130. Since the mount 130 has the same natural frequency as the shell 100, the mount 130 is vibrated instead of the shell 100, thereby reducing vibration and noise of the shell 100. The mount 130 has the curvature so that the part 130a attached to the shell 100 can be positioned higher than the part 130b attached to the apparatus. Therefore, the shell 100 is not in contact with the apparatus but spaced apart therefrom. A mass and an elastic modulus of the mount 130 are set to control the natural frequency of the mount 130 according to the natural frequency of the shell 100. Holes 135 may be formed in the mount 130 to control the mass and the elastic modulus of the mount 130. The mass of the mount 130 can be controlled according to the overall size of the holes 135, and the elastic modulus of the mount 130 can be controlled according to the arrangement and shape of the holes 135.

Figure 8:
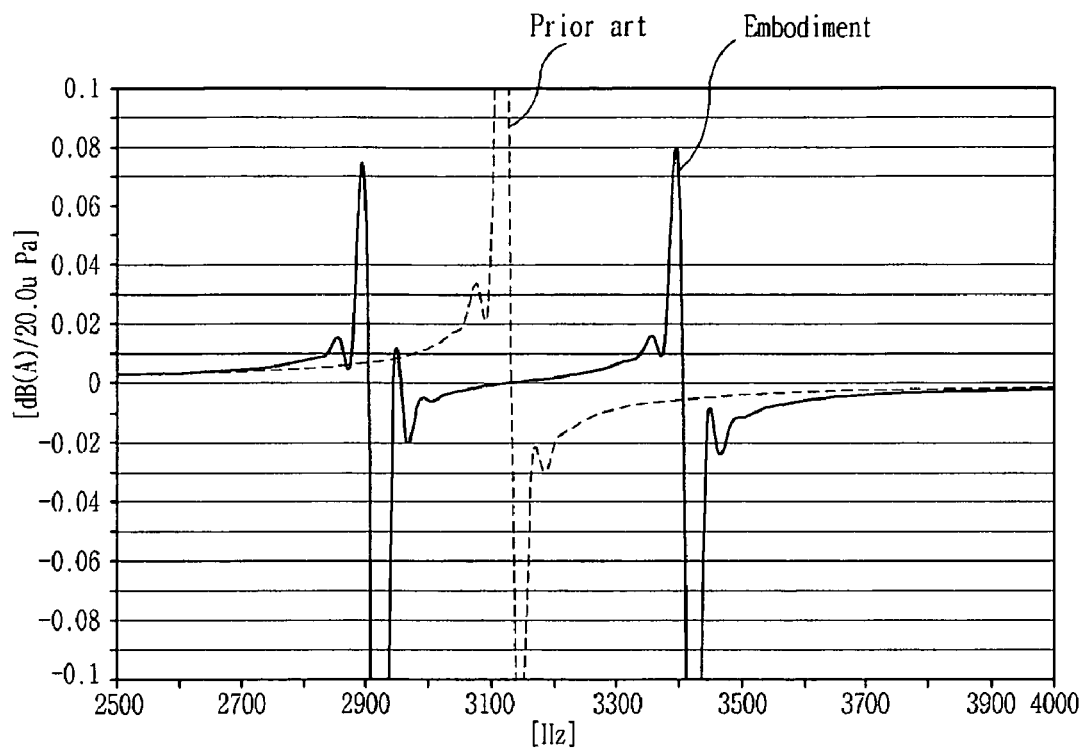
FIG. 8 is a graph showing a major noise band of a conventional compressor, and variations of the noise band in use of the mount applied with a dynamic vibration absorber concept according to one embodiment of the present invention.
Figure 9:
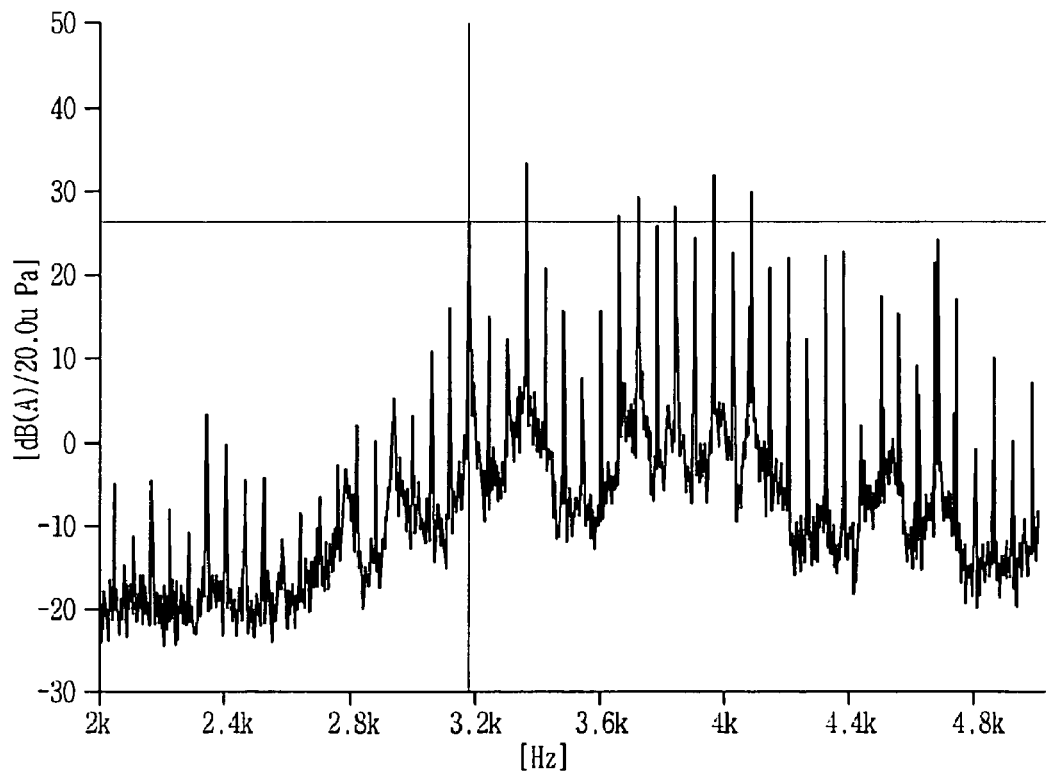
FIGS. 9 and 10 are graphs showing noise measurement results before and after controlling the natural frequency of the mount, respectively.
Figure 10:
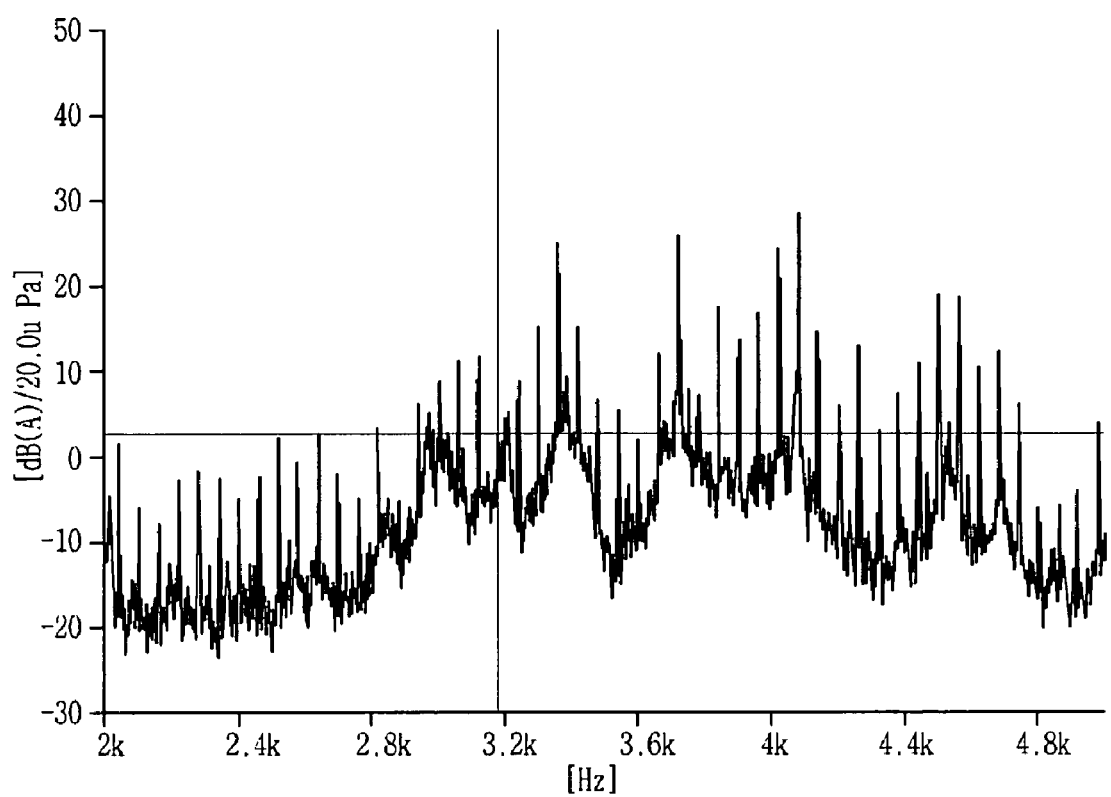

FIG. 8 is a graph showing a major noise band of a conventional compressor, and variations of the noise band in use of the mount applied with a dynamic vibration absorber concept according to one embodiment of the present invention, and FIGS. 9 and 10 are graphs showing noise measurement results before and after controlling the natural frequency of the mount, respectively. In the experiment, the natural frequency of the shell was 3189 Hz. Referring to FIG. 8, in case of the conventional compressor, major noise occurred between 3100 Hz and 3200 Hz. Meanwhile, in case of the compressor with the mount of the dynamic vibration absorber concept attached thereto according to one embodiment of the present invention, major noise was dispersed to 2900 Hz and 3400 Hz, so that an absolute magnitude of noise was reduced. FIG. 9 is a graph analyzing a noise magnitude in 3180 Hz of the conventional compressor, and FIG. 10 is a graph analyzing a noise magnitude in 3180 Hz of the compressor according to one embodiment of the present invention. As illustrated in two graphs of FIGS. 9 and 10, the conventional compressor generated 26.9 dB of noise, but the compressor according to one embodiment of the present invention generated 2.52 dB of noise, i.e., considerably reduced the noise magnitude in the major noise band.

The present invention has been described in detail with reference to the embodiments and the attached drawings. However, the scope of the present invention is not limited to the embodiments and the drawings, but defined by the appended claims.

INDUSTRIAL APPLICABILITY

According to the present invention, as the mount for installing the compressor in the apparatus functions as a vibration absorber, vibration of the compressor can be reduced without using a separate vibration absorber.

In addition, according to the present invention, the mount has the natural frequency controlled according to the natural frequency of the shell so as to absorb vibration of the shell. Therefore, noise of the compressor by vibration can be suppressed.

Moreover, according to the present invention, vibration and noise of the compressor are reduced, so that vibration and noise of the entire apparatus in which the compressor is installed can be reduced.

The invention claimed is:

1. A compressor, comprising:
a compressor main body for compressing refrigerant;
a shell for accommodating the compressor main body; and
a plurality of mounts welding-attached to a one side and an other side of the shell at at least one weld-fixing point, for installing the shell to an apparatus in which the compressor is to be installed, each of the plurality of mounts including two divided parts of a shell side part and an apparatus side part by a line passing through the at least one weld-fixing point, wherein each divided part has a different natural frequency and at least one of the divided parts has a natural frequency controlled to be included in any one of a first natural frequency of the shell±15 Hz and a second natural frequency of the shell±15 Hz.

2. The compressor of claim 1, wherein at least one of the plurality of mounts is provided with a single weld-fixing point fixed to the shell, and divided into the shell side part and the apparatus side part by a line passing through the single weld-fixing point.

3. The compressor of claim 1, wherein at least one of the plurality of mounts is provided with two or more weld-fixing points positioned on a straight line to be fixed to the shell, and divided into the shell side part and the apparatus side part by the straight line passing through the two or more weld-fixing points.

4. The compressor of claim 1, wherein at least one of the plurality of mounts is provided with two weld-fixing points positioned on a straight line and one weld-fixing point positioned outside the straight line to be fixed to the shell, and divided into the shell side part and the apparatus side part by a line passing through the three fixing points.

5. The compressor of claim 1, wherein at least one of the plurality of mounts is provided with four or more weld-fixing points positioned on two or more straight lines to be fixed to the shell, and divided into the shell side part and the apparatus side part by the apparatus side straight line, and wherein at least one of the shell side part and the apparatus side part has a natural frequency in any one of the first natural frequency of the shell±15 Hz and the second natural frequency of the shell±15 Hz.

* * * * *